3,728,101
PROCESS FOR MAKING STAINLESS STEEL
John C. d'Entremont, Middletown, and Charles R. Taylor, Trenton, Ohio, assignors to Armco Steel Corporation, Middletown, Ohio
No Drawing. Filed Nov. 9, 1970, Ser. No. 88,181
Int. Cl. C21c 5/52; C22c 39/14
U.S. Cl. 75—11    9 Claims

ABSTRACT OF THE DISCLOSURE

An economical process for making a molten ferrous alloy containing from about 5.0 to 30.0% by weight chromium, and up to about 25.0% by weight nickel, which process includes the steps of preparing a charge consisting primarily of the ores of chromium and iron, smelting and reducing said charge by the submerged-arc process in a first vessel to yield a high carbon, high silicon molten alloy, transferring said alloy to a second vessel, directing gaseous oxygen thereagainst to reduce the carbon and silicon, and thereafter introducing a mixture of gaseous oxygen and an inert gas into said molten alloy below the surface thereof to complete the refining and to minimize the loss of chromium.

BACKGROUND OF THE INVENTION

This invention relates to an economical process for making a molten ferrous alloy of the stainless steel type. It represents a departure from the known procedures by utilizing a charge consisting primarily of ores of chromium and iron.

The known practices for making stainless steel today use either an arc melting furnace, where the electrodes are positioned just above the molten bath; an oxygen converter, or a combination of the two operations. These procedures have been further modified by the use of a vacuum in a degasser, ladle, or in the steel making vessel itself to assist in the removal of the undesirable gasses and to aid in the refining process. But contrary to the present invention, the charge into the furnace or converter usually consists of stainless steel which must have been segregated or classified prior to its use, carbon steel scrap, a small quantity of iron ore, fluxing agents and ferro-alloys. One of the primary ferro-alloys used is a ferro-chromium which may be of either the low carbon or high carbon varieties. Ferro-chromium, particularly the low carbon type, is an expensive source of chromium. Generally the high carbon ferro-chromium is added first and the slag taken off before adding low carbon ferro-chromium to adjust the chromium under a finishing slag. The Feild patent, No. 1,925,182, represents an improvement on some of the earlier practices by permitting the charging of stainless steel scrap, iron oxide and high carbon ferro-chromium. The process disclosed in the Arness patent, No. 1,954,400, represents an additional change in the practice by a partial substitution of the ferro-chromium with chromium ore.

These practices, though representing improvements over the prior art, nevertheless brought with them new problems or inconveniences. For example, the high cost of the charging ingredients i.e. raw materials or labor costs for classifying scrap, add considerably to the high refining and production costs of stainless steel. This necessarily limits its wide spread use, despite the many advantages of stainless steel over carbon steel and other low cost metals. While it may not be apparent at this point, it was discovered that a considerable savings could be made by the judicious use of techniques developed in the manufacture of ferro-alloys. The latter may be defined, but without intending to limit this invention, as any material having an unusually large metallic ingredient which is not available as scrap material. Obviously, this eliminates the commercial products such as carbon steels, alloy steels, stainless steels, and some of the more exotic materials.

As typical with most steel making practices, advances in the stainless steel arc furnace production have been many in the past few years. However, the improvements have for the most part been in the melting and refining processes through the use of new apparatus and atmosphere control, including the practices of oxygen blowing or L-D process, vacuum degassing, electron beam melting, and using inert gasses for mixing and flushing the molten alloy. However, even here where improvements have been made, there have been attendant problems which had to be overcome. For example, in the oxygen blowing process where the major portion of the carbon is removed, there is always a major concurrent loss in chromium. This is due to the high affinity of chromium for oxygen. That is, much of the chromium is lost to the slag which necessitates a longer refining period to return the chromium from the slag into the molten metal. One solution which appears to overcome this problem is the one taught in the Krivsky patent, No. 3,252,790.

However, one area where the total process has suffered is in the improvements in starting materials. Where stainless steel scrap forms a large part of the charge one must be extremely careful to segregate properly the nickel bearing stainless steels from the straight chromium grades. This is due to the fact that nickel is almost impossible to remove from the molten bath. Other than in the areas of classifying scrap, the main thrusts of the improvements have been in the more efficient balancing of the materials and in the sequence in which they are charged.

SUMMARY OF THE INVENTION

The present invention is a combination of three operations, all of which are known per se, but when combined form a unique combination whereby an economical process for making stainless steel results. This combination of steps may be accomplished in apparatus known to the stainless steel producers. Specifically, the first step of the process makes use of the submerged-arc furnace of the type used for many years in smelting ferro-alloys. This furnace is quite different from the typical electric arc furnace used in melting ferrous scrap to produce alloy steels. While each employs multiple electrodes through which electric current is applied to the charge, in the former the electrodes are submerged in the charge. Here, the heating and melting is by arc and resistance heating. In contrast to this, in electric arc heating the electrodes are disposed above the charge such that the heating and melting is primarily by radiation. Further, the latter is essentially a batch type operation, i.e. charge, melt, refine and tap, while in a submerged arc process the operation is continuous.

The charge of material employed in the first step of this invention consists primarily of the ores of chromium and iron. Typically, the ores will comprise at least 65% of the charge. The balance will be made up between carbonaceous fuels, fluxes, and up to about 10% ferrous and/or alloy scrap.

The second and third steps occur in a second vessel such as an oxygen converter or a basic oxygen furnace. Typically, this type of vessel is open at the top to receive an oxygen lance, and is also capable of being tilted or rotated to remove the molten metal. For example, after the smelting and reducing of step one, the high carbon, high silicon molten chromium containing alloy is transferred to said second vessel. The alloy is oxygen blown to reduce the carbon and silicon, and is then subjected to a mixture of gaseous oxygen and an inert gas introduced below the surface of the molten alloy. This latter step completes the refining operation while minimizing the loss of chromium.

Despite the fairly high cost of operating a submerged-arc furnace for making the initial molten alloy, the charging of a molten alloy tailored to the final composition of the stainless steel more than off sets these costs in many areas of the world.

DETAILED DESCRIPTION OF PREFERRED EMBODIMENT

In the preferred practice of this invention, there is taught a process of producing a molten ferrous alloy containing from about 5.0 to 30.0% by weight chromium, preferably from about 10.0% to about 18.0%, and up to about 25.0%, preferably up to about 12.0% by weight nickel, in an economical manner.

The above recitation of chemistry does not mean to suggest that other elements are not found nor critical to the process as taught herein. In fact, the carbon content of the alloy from the submerged-arc furnace is very important. Because the ores are reduced by coke or other carbonaceous materials, the molten alloy from the submerged-arc furnace, which as explained above is charged into the second vessel, will contain some carbon. This carbon will range from about 2% to about 7%, the precise amount depending upon the chromium, silicon, and temperature in the alloy. As will be explained later, this carbon is necessary in order to provide sufficient fuel for the final refining step which takes place under oxidizing conditions.

Another element which is of considerable importance to this operation is silicon. In the present invention the silicon is reduced from quartzite or the respective ores and is present in the molten product of the submerged-arc furnace. Silicon is normally present in amounts between about 0.5% to about 2.0% by weight. The silicon is co-reduced with the chromium and iron and serves as a supplemental source of fuel. Generally the final stainless alloy will contain less than about 1.0% by weight silicon so that most of the silicon ends up as calcium silicates in the slag formed as a result of the flux or limestone additions.

Although other elements are useful as alloy additions to the strainless steel, they are generally not present in the initial charge. Most of these elements, such as manganese, will suffer some losses in the oxygen furnace and may be more efficiently added as a ferro-alloy after the refining process. Typically, these additions are made to the ladle.

As is typical with most steel making processes, there are various impurities which will be picked up or are present from the initial charge materials. However, the ability to control these impurities to rather low levels in the smelting process contributes significantly to its value. For example, sulfur may be reduced to a much lower value than that in presently charged material and electric arc or converter melting vessels. Further, the submerged-arc furnace has the added advantage of producing a more uniform charge material from heat to heat than is possible through the use of scrap and arc melting furnaces.

At this juncture, it may be helpful to demonstrate the further advantages of this invention by way of an exemplary embodiment. While a standard Type 410 stainless steel will be used for this purpose, it should be understood that a range of stainless steels and chromium alloy steels can be produced by this process.

Example

To further assist in understanding this invention, the following values or figures are based on the final production of one (1) ton of liquid alloy, i.e., Type 410 stainless steel.

To produce a liquid alloy (1 ton) from the submerged-arc furnace having an aim composition as follows:

|  | Percent |
|---|---|
| Chromium | 12.5 |
| Carbon | 5.0 |
| Silicon | 1.5 |
| Iron | Balance. | a charge was made from the following:

|  | Lbs. |
|---|---|
| Transvaal chrome ore | 845 |
| 30.8% Cr | |
| 19.2% Fe | |
| 2.4% Si | |
| Iron ore | 1890 |
| 65.2% Fe | |
| 5.1% Si | |
| Iron scrap | 157 |
| Coke | 670 |
| Total charge | 3562 |

From the above, it will be observed that the ores comprised nearly 78% of the charge, and that the metallic content thereof, specifically, chromium and iron, amounted to about 55% of the charge. Each of said values are sufficiently above the minimums of 65% and 50% respectively.

The silicon content of the ores was considerably more than was needed for the smelting and reducing so that no quartzite was added to the charge. But, it should be made apparent that if prior calculations fail to indicate that sufficient silicon is present in the charge, quartzite or other silicon bearing materials may be added to supplement the charge. Further, fluxing materials may also be added but generally in quantities which do not substantially affect the numerical values given above.

The above charge as prepared is then smelted and reduced in a submerged-arc furnace for a sufficient time to produce a liquid alloy having the aforementioned chemistry, and tapped at a temperature between about 1520° to about 1630° C.

Said alloy is then transferred to an oxygen converter where pure gaseous oxygen, by means of a lance, is directed to a position just above the surface thereof to decarburize the alloy down to approximately 0.10–0.20% by weight carbon. Concurrently, the silicon is reduced down to about .02–.04% by weight. The precise low level of carbon reached during the initial oxygen blow, without any substantial loss of chromium, depends on the final chromium level and the temperature. This is due in part to the relatively strong affinity of chromium for carbon. But in any case, such levels can be readily determined for the particular grade of alloy to be melted.

To finish the refining operation, the oxygen lance is lowered to below the surface of the alloy and the gaseous oxygen is supplemented with an inert gas; the ratio of the oxygen-inert gas mixture ranging between about 3/1 and 1/5. While argon is the preferred inert gas of said mixture, it should be understood that other inert gases such as neon, krypton, xenon, helium and nitrogen may be used. The action of the gaseous mixture is continued until the carbon is further reduced to the desired level.

It is not critical to this invention to inject said gaseous mixture into the liquid alloy by means of a lance lowered through the slag and into the molten bath. The gaseous mixture may come from fixed annular submerged tuyeres disposed near the base of the oxygen converter or vessel.

As the desired level of carbon is reached, alloying additions may be made and the temperature adjusted for tapping into a suitably prepared ladle. In those situations where it may be necessary to recover alloying elements such as chromium from the slag blanket, reducing agents such as ferro-silicon, and fluxes such as lime and spar may be added. This, however, is a practice well known in the steel making art and need not be discussed in detail here.

It can be seen from the above embodiment that the new process combines the latest practice in the decarburization and deoxidation of stainless steel melts with a considerably less expensive procedure for charging the refining vessel. It is unnecessary to purchase ferro-alloys such as ferro-chromium. The molten product from the submerged-arc furnace has a composition very close in chromium content to the scheduled stainless steel desired. The carbon content can be easily adjusted in the oxygen converter or similar refining vessel. The thermal energy used to produce the molten alloy is conserved and utilized in the production of the final product, instead of being dissipated by allowing the ferro-chromium to solidify, and then re-melting it as is practiced in the conventional process.

The embodiments of the invention in which an exclusive property or privilege is claimed are defined as follows:

1. A process for making molten ferrous alloys containing from about 5.0 to 30.0% by weight chromium, and up to about 25.0% by weight nickel, characterized by the production of an unrefined liquid ferrous alloy and the refining of said liquid ferrous alloy by subjecting it to two gaseous treatments and making finishing additions thereto, said process comprising the steps of introducing into a vessel a charge consisting primarily of iron ore and chromium ore, smelting said charge in said vessel by means of a submerged arc to provide an unrefined liquid ferrous alloy consisting essentially of about 5.0 to 30.0% by weight chromium, up to about 25% by weight nickel, at least 2.0% by weight carbon, up to about 2.0% by weight silicon and the balance being essentially iron, transferring said liquid ferrous alloy from said vessel for refining with oxygen, blowing pure gaseous oxygen against said liquid alloy to partially reduce said silicon and carbon, continuing said oxygen blow until the carbon has been reduced to less than about .20% by weight, and immediately thereafter finishing said refining by introducing pure gaseous oxygen and an inert gas into said liquid alloy below the surface thereof to bring the carbon content to the desired final level and making finishing additions and temperature adjustments to meet the desired final chemistry and tap temperature.

2. The process claimed in claim 1 wherein said vessel in which said charge is smelted comprises a first vessel, transferring said unrefined liquid ferrous alloy from said first vessel to a second vessel, and performing said steps of blowing pure gaseous oxygen against said liquid alloy, introducing pure gaseous oxygen and an inert gas into said liquid alloy below the surface thereof and making finishing additions and temperature adjustments in said second vessel.

3. The process according to claim 1, wherein said inert gas is selected from the group consisting essentially of argon, neon, krypton, xenon, helium, and nitrogen.

4. The process according to claim 1, wherein said ores comprise at least 65% of said charge.

5. The process according to claim 4, wherein the balance of said charge comprises carbonaceous fuels, fluxes, and up to about 10% ferrous scrap.

6. The process according to claim 1, wherein the total metallic contents of said ores is at least 50%.

7. The process according to claim 1, wherein said inert gas is argon, and that the ratio of oxygen to argon ranges between about 3/1 to 1/5.

8. The process according to claim 1, wherein the smelting and reducing occurs at a temperature between about 1520° and 1630° C.

9. The process according to claim 1, wherein the unrefined liquid ferrous alloy consists essentially of about 10.0 to 18.0% by weight chromium.

References Cited

UNITED STATES PATENTS

| | | | |
|---|---|---|---|
| 3,012,875 | 12/1961 | Senior | 75—11 |
| 2,986,459 | 5/1961 | Udy | 75—11 |
| 3,208,117 | 9/1965 | Goedecke | 75—59 |
| 2,871,008 | 1/1959 | Spire | 75—59 |
| 3,336,132 | 8/1967 | McCoy | 75—130.5 |
| 3,001,863 | 9/1961 | Greffe | 75—11 |
| 2,546,340 | 3/1951 | Hilty | 75—130.5 |
| 3,502,461 | 3/1970 | Guttler | 75—11 |
| 2,176,686 | 10/1939 | Udy | 75—130.5 |
| 2,127,074 | 8/1938 | Udy | 75—130.5 |
| 2,473,021 | 6/1949 | Spendelow | 75—130.5 |

WINSTON A. DOUGLAS, Primary Examiner

P. D. ROSENBERG, Assistant Examiner

U.S. Cl. X.R.

75—130.5